Dec. 7, 1937.  H. W. LISOWITZ  2,101,588

EMERGENCY CHAIN FOR AUTOMOBILE TIRES

Filed Jan. 9, 1937

INVENTOR.
Herman W. Lisowitz
BY
Mark M. Aecker
ATTORNEY.

Patented Dec. 7, 1937

2,101,588

UNITED STATES PATENT OFFICE 2,101,588

EMERGENCY CHAIN FOR AUTOMOBILE TIRES

Herman W. Lisowitz, Uniontown, Pa.

Application January 9, 1937, Serial No. 119,793

2 Claims. (Cl. 152—14)

My invention relates to emergency chains for automobile tires and the object is to provide an emergency chain which will be simple in construction, cheap to manufacture, durable and efficient in its working.

My invention consists of certain novel features and details of construction, as will be more fully described hereinafter and finally pointed out in the claims.

I will now describe my invention, reference being had to the accompanying drawing, in which similar letters of reference indicate corresponding parts in the several figures, and in which—

A detailed description of my invention is as follows:

A represents the side plates as used in my preferred construction. These plates are provided with transverse slots B, and longitudinal slots C, and reinforcements D, the purpose of which will appear hereinafter.

Figures 9, 10, 11:
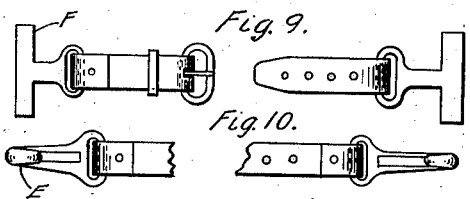
Fig. 9 is a plan view of a pair of straps having T connections as used with the style of plate shown in Figs. 1, 2, 3, 4, 5, and 6.
Fig. 10 shows another pair of straps provided with snap-hooks, which may be used with all the several forms of my improved side-plates.
Fig. 11 shows another form of my invention.

The transverse slots B, are for the purpose of receiving the snap-hooks E, on the ends of the straps shown in Fig. 10, while the longitudinal slots C, are for the purpose of receiving the T-shaped connections F, on the ends of the straps shown in Fig. 9.

The straps described in Figs. 9 and 10 may be used alternately, as desired, to hold the chains securely on the tires.

Figure 1:
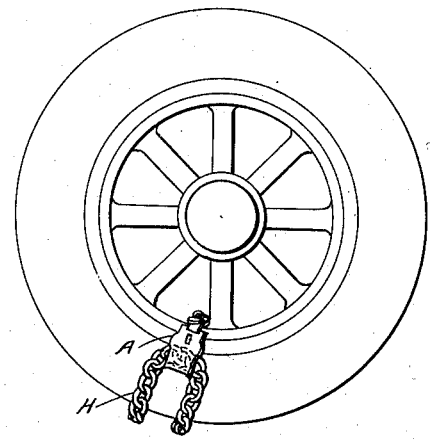
Figure 1 represents a side elevation of an automobile wheel, showing one of my improved emergency chains attached thereto.
Figures 2, 3:
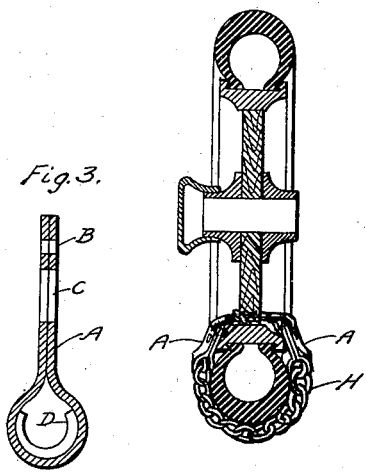
Fig. 2 is a central vertical sectional view of the same.
Fig. 3 is a vertical sectional view of one of the side plates, such as is shown in Fig. 4.
Figure 4:
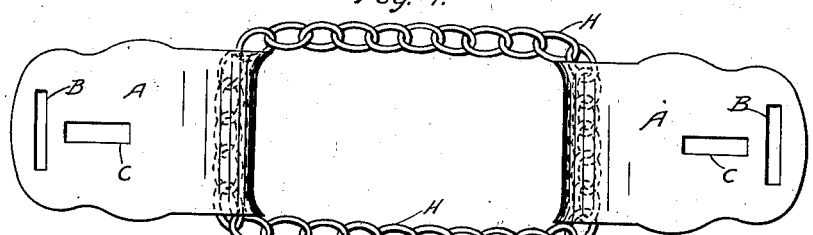
Fig. 4 is a plan view of my improved emergency chain in its completed form, better showing the continuous chain employed.
Figures 5, 6:
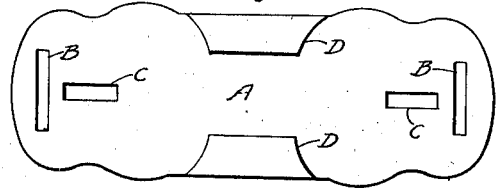
Fig. 5 is a plan view of one of the side plates, before being bent into the form shown in Fig. 3.
Fig. 6 is a central sectional view of the same.

The side plates shown in Figs. 1, 2, 4, 5, 6, 7, and 8, are bent into the form shown in Fig. 3, which provides the channel for receiving the continuous round chain which forms a U-shape on each side of the tire and permits the chain to travel laterally and for easy removal when the chain becomes worn out. The reference letter H, designates the chain above referred to.

Reinforcements D, best shown in Figs. 3, 5, 6, 7, and 8, are formed on both outside edges of the plates for the purpose of prolonging the life of the plates. These reinforcements are stamped with the plates proper and are bent inwardly and over the channel part of the plates.

Figures 7, 8:
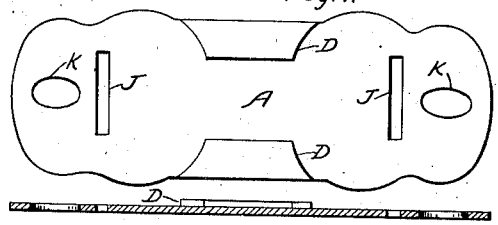
Fig. 7 is a plan view of a modified form of my improved plate.
Fig. 8 is a central sectional view of the same.

The modification shown in Figs. 7 and 8 shows slots J, and openings K, formed the reverse of those shown in Figs. 1, 2, 3, 4, 5, and 6. The transverse slots J being for the purpose of receiving a plain strap, while the openings K are for receiving snap-hooks.

The modification shown in Fig. 11 is formed principally from heavy wire, one side L being provided with a tongue M for engaging the end of a strap, and to the opposite N, may be secured the opposite end of the strap. The two sides being connected together by means of a metal channel O for carrying and retaining the continuous chain.

The purpose of my invention is to do away with the necessity of using special type of pliers or other special devices for removing worn chains and replacing new ones, as is necessary with other types of emergency chains, now in use.

By the lateral movement of the continous chain within the side plates, the life of the chain is greatly prolonged.

Having described my invention, what I claim and desire to secure by Letters Patent is:

1. An emergency chain for automobile tires, consisting of two side-plates each of which is provided with transverse and longitudinal slots, reinforcements formed on the outer edges of said plates, in combination with a continuous chain carried by said plates, all substantially as and for the purposes shown and described.

2. An emergency chain for automobile tires, consisting of two metallic side-plates each of which is provided with transverse and longitudinal slots one of which is adapted to receive a snap-hook or strap and the other a T-shaped connection on the ends of a strap, in combination with a continuous chain which is adapted to move laterally through the channels formed between said side-plates all substantially as shown and for the purposes described.

HERMAN W. LISOWITZ.